A. J. C. SCHWARTZ.
GRATING DEVICE.
APPLICATION FILED JULY 8, 1911.
1,078,558.
Patented Nov. 11, 1913.
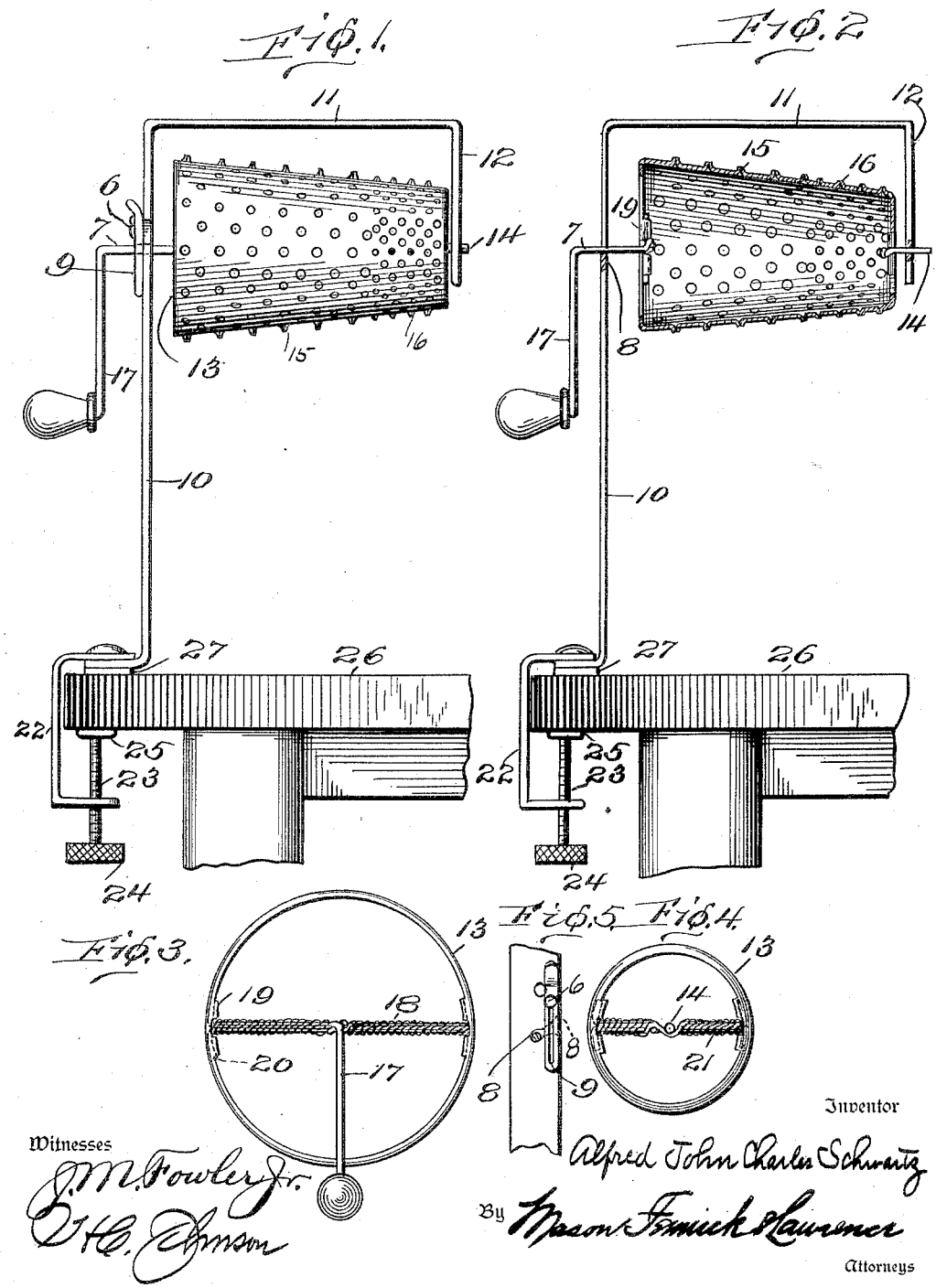

UNITED STATES PATENT OFFICE.

ALFRED JOHN CHARLES SCHWARTZ, OF CHICAGO, ILLINOIS.

GRATING DEVICE.

1,078,558.  Specification of Letters Patent.  Patented Nov. 11, 1913.

Application filed July 8, 1911. Serial No. 637,430.

*To all whom it may concern:*

Be it known that I, ALFRED JOHN CHARLES SCHWARTZ, a citizen of the United States, residing at Chicago, in the county of Cook and State of Illinois, have invented certain new and useful Improvements in Grating Devices; and I do hereby declare the following to be a full, clear, and exact description of the invention, such as will enable others skilled in the art to which it appertains to make and use the same.

This invention relates to rotary grating devices and the object is to provide an improved grating surface and improved means for mounting the device in a framework which can be readily attached to a table or other support.

In the accompanying drawings forming a part of this application, Figure 1 is a view of the device in side elevation. Fig. 2 is a view partly in section and partly in elevation. Fig. 3 is an end view of the grating cylinder. Fig. 4 is a view of the opposite end thereof. Fig. 5 is a detail view.

In carrying out my invention, I provide a suitable vertical support 10 which has connected therewith a right angled portion 11 terminating in a downwardly projecting member 12 affording a bearing for the pivot 14 carried by one end of cylinder 13.

The device 13, although termed a cylinder for convenience, is in fact in the form of a frustum of a cone and is provided with upstanding projecting devices 15 which may occupy approximately two-thirds of the surface from one end of member 13 to the other, and with similar upstanding devices 16 which occupy the remaining one-third of the surface of the member 13. The members 16 are smaller and arranged more closely than are the members 15 on the left hand portion of the cylinder, as shown in Fig. 1, and the right hand portion constitutes, therefore, a finer grating surface.

A crank 17 is connected with the left hand end of the cylinder 13 and has its bearing in upright 10 which is slotted at the point 8 for the purpose of receiving the horizontal portion 7. A catch 9 holds the member 7 in position in the slot, the said catch being also slotted for the purpose of affording a lengthwise movement on pivot 6. A twisted wire member 18 extends transversely and diametrically of the larger end of the member 13 and the free ends thereof extend laterally and are secured by means of ears 19 projecting from the sides of member 13, such ears being bent inwardly over the projecting portions 20 of member 18. Portion 7 of crank 17 is secured to cross bar 18 and provides means for rotating cylinder 13. Pivot 14 is secured to a cross bar 21 of twisted wire in similar manner at the opposite end of member 13. Upright 10 is secured to a clamping member 22 which carries a threaded bolt or screw 23 provided with a thumb piece 24, such bolt having a swivel member 25 for contacting with the edge of a table or other support 26. A cross bar 27 is mounted at the point shown in Figs. 1 and 2, within the clamp, and serves to contact with the upper surface of table 26. It may be added that one of the wires of member 18 is continuous with the portions 7 and 17, and that the same principle is followed in connection with members 14 and 21 at the opposite end of the rotating cylinder.

I claim:

1. The combination with a rotatable member, of a bar of twisted wire extending transversely of one end thereof and having its ends outwardly turned, ears projecting from the side of the rotatable member and bent over the outwardly turned ends of the said bar and securing the same, a strand of the twisted wire bar being extended axially to the said rotatable member to form the trunnion proper, and the said ears being bent to engage and secure the bent ends of the strands.

2. The combination with a rotatable member provided at one end at diametrically opposite points with pairs of spaced ears, of a trunnion for the member comprising a length of wire extending diametrically across the said end of the member and having its ends bent at an angle, a length of wire twisted about the first mentioned length and having one end bent at an angle and its other end terminating at a point substantially midway between the ends of the first mentioned length, and a length of wire twisted about the first mentioned length and having one end bent at an angle, the last mentioned length of wire, at a point substantially midway between the ends of the first mentioned length, being bent to extend axially with respect to the rotatable member to constitute the trunnion proper.

In testimony whereof I affix my signature in presence of two witnesses.

ALFRED JOHN CHARLES SCHWARTZ.

Witnesses:
EDWARD SCHWEGLER,
KATE MATTES.